United States Patent
Oizumi et al.

(10) Patent No.: US 6,778,830 B1
(45) Date of Patent: Aug. 17, 2004

(54) MOBILE TELECOMMUNICATION SYSTEM AND CHANNEL HANDOFF SYSTEM BETWEEN THE MOBILE TELECOMMUNICATION SYSTEMS

(75) Inventors: Yasuhiro Oizumi, Tokyo (JP); Hirofumi Shiotsuki, Tokyo (JP)

(73) Assignee: NEC Corporation, Tokyo (JP)

( * ) Notice: Subject to any disclaimer, the term of this patent is extended or adjusted under 35 U.S.C. 154(b) by 577 days.

(21) Appl. No.: 09/695,069

(22) Filed: Oct. 25, 2000

(30) Foreign Application Priority Data

Oct. 26, 1999 (JP) .......................................... 11-304659

(51) Int. Cl.[7] ................................................. H04Q 7/20
(52) U.S. Cl. ................... 455/436; 455/432.1; 455/439; 455/442; 455/443; 455/403; 455/406
(58) Field of Search .............................. 455/436, 432.1, 455/439, 442, 443, 403, 406

(56) References Cited

U.S. PATENT DOCUMENTS

| | | | | |
|---|---|---|---|---|
| 5,396,541 A | * | 3/1995 | Farwell et al. | 455/403 |
| 5,915,214 A | * | 6/1999 | Reece et al. | 455/406 |
| 5,950,127 A | | 9/1999 | Nitta et al. | 455/426 |

FOREIGN PATENT DOCUMENTS

| JP | 5-218953 | 8/1993 |
|---|---|---|
| JP | 9-121376 | 5/1997 |

* cited by examiner

Primary Examiner—Erika Gary
Assistant Examiner—David Q Nguyen
(74) Attorney, Agent, or Firm—Foley & Lardner LLP

(57) ABSTRACT

The telecommunication system has mobile telecommunication systems located with their coverage service areas overlapped with each other. Each of the mobile telecommunication systems provides a communication service to a mobile telephone terminal through a radio base station and a radio base station control unit. The radio base station control unit controls communication processing of the radio base station and the mobile telephone terminal. The radio base station control unit has a first means for providing a hard-handoff command signal to command the mobile telephone terminal to execute a hard handoff when the mobile telephone terminal is in the overlapped service area. The hard-handoff command signal is prescribed to become effective at a predetermined time after the mobile telephone terminal receives the hard-handoff command signal. The radio base station control unit has also a second means for providing a hard-handoff command cancellation signal to command the mobile telephone terminal to cancel the hard-handoff command signal when the hard-handoff command signal has not become effective yet. The mobile telephone terminal has means for executing cancellation of the hard-handoff command signal in response to the hard-handoff command cancellation signal.

8 Claims, 6 Drawing Sheets

MOBILE TELECOMMUNICATION SYSTEM AND CHANNEL HANDOFF SYSTEM BETWEEN THE MOBILE TELECOMMUNICATION SYSTEMS

BACKGROUND OF THE INVENTION

The present invention relates generally to a mobile telecommunication system and a channel handoff system between the mobile telecommunication systems. The present invention relates more specifically to a mobile telecommunication system and a channel handoff system between the mobile telecommunication systems intended to check deterioration of a service quality at the time of a handoff between mobile telecommunication systems provided by different vendors or operators.

In a conventional CDMA (Code Divisional Multiple Access) mobile telecommunication system under TIA (TELECOMMUNICATIONS INDUSTRY ASSOCIATION)/ET (Interim Standard)-95, a handoff to a CDMA or FDMA (Frequency Divisional Multiple Access) telecommunication system. has been performed as shown in FIG. 1.

FIG. 1 shows a schematic diagram illustrative of a conventional mobile telecommunication system.

CDMA mobile telecommunication system 100 comprises mobile telephone terminal 1 of subscriber's own, radio base station (hereinafter referred to as BS) 10 and radio base station control unit (hereinafter, referred to as BSC) 12. BS 10 establishes a radio communication with mobile telephone terminal 1 within its own service area. BSC 12 controls the communication processing of radio BS 10 and mobile telephone terminal 1. It is assumed that mobile telephone terminal 1 has already completed an establishment of a communication with the concerned BS 10, to connect the terminal 1 with a subscriber of a PSTN (public switched telephone network), or another subscriber within the service area of the concerned base station 1. In addition to the above-described communication control, BSC 12 carries out a call channel handoff control.

It is further assumed that mobile telecommunication system 200 is a CDMA or an FDMA mobile telecommunication system which provides a telecommunication service under management of a vendor or an operator differing from that of system 100. Mobile telecommunication system 200 as well comprises mobile telephone terminal 1, BS 20 and BSC 22.

While mobile telecommunication systems 100 and 200 each have a plurality of radio base stations and radio base station control units connected to provide telecommunication services in cooperation, only one radio base station and only one radio base station control unit are represented for each of the mobile telecommunication systems in FIG. 1 for simplicity of the explanation. It is also assumed that BS 10 in mobile telecommunication system 100 and BS 20 in mobile telecommunication system 200 have overlapping service areas 34, and that each of the systems 100 and 200 has a capacity to provide a sufficiently high-quality service in the individual overlapping service area.

However, a problem comes up in the overlapping service area when neighboring mobile telecommunication systems that manage telecommunication services are provided by different vendors/operators.

It is ordinary that a radio communication interface for a frequency, for example, used in the communication between a mobile telephone terminal and a radio base station differs depending on a vendor/operator of the telecommunication system.

For this reason, mobile telephone terminal 1 in overlapping service area 34 cannot afford to establish calls at the same time between the terminal 1 itself and both of radio base stations 10 and 20 provided by different vendors/operators.

As a result, when mobile terminal 1, which has had an established communication with BS 10, is required to establish a new communication with BS 20 of a different vendor or a different operator, it is necessary both to perform a handoff in the overlapping service area and to synchronize the communication in a wireless region between mobile terminal 1 and BS 20.

Now, referring to FIG. 1, suppose there is a case where mobile terminal 1 moves in the direction from ① toward ⑥. While moving within the service area 14 of mobile telecommunication system 100, mobile terminal 1 maintains the established communication with base station 10 and BSC 12 through radio transmission path 10r.

As mobile terminal 1 advances further toward ⑥ through point ② to ③, it starts to enter overlapping service area 34. Mobile radio terminal 1, upon reaching a hard handoff boundary point④, notices BSC 12 by means of BS 10 that the electric-field intensity of the radio signal transmitted from BC 10 of mobile telecommunication system 100 has reduced to less than a channel-drop threshold predetermined to judge whether or not the concerned call is to be dropped from mobile telecommunication system 100, as well as notices the field intensities of the radio signals transmitted from the peripheral base stations (cf. C1 and C2 in FIG. 2).

FIG. 2 is a time sequence diagram illustrative of procedures to perform a handoff of a call between the two radio telecommunication systems.

BSC 12, when receiving a notice C2, judges whether mobile telecommunication system 200 can provide a better quality of service in its coverage service area 24 to mobile telephone terminal (MT) 1 of interest than mobile telecommunication system 100 can in its own coverage service area 14, based on the information about the field intensities included in the received notice C2.

In case that BSC 12 judges the system 200 to be preferred to offer a better quality of service, then BSC 12 of mobile telecommunication system 100 sends, to BSC 22 of mobile telecommunication system 200, a request for reserving a call channel of BS 20 in order to reserve a new call channel of mobile telecommunication system 200 to be used after the hard handoff (cf. FIG. 2, C3 and C4). BSC 12 also sends, to mobile terminal 1 through BS 10, a hard-handoff signal to handoff the call to mobile telecommunication system 200 (cf. FIG. 2, C5 and C6).

Mobile terminal 1 performs a hard handoff upon receiving the hard-handoff signal and transmits a hard-handoff completion signal to BSC 22 through BS 20 (cf. FIG. 2, C7 and C8).

BSC 22, when receiving the-handoff completion signal, sends a request for releasing the concerned call channel of BS 10 to BSC 12 of mobile telecommunication system 100 so that the call channel employed before the handoff will be freed.

Mobile telephone terminal 1 thereafter is normally in an established communication with BS 20 and BSC 22 through radio transmission path 20r in coverage service area 24 of mobile telecommunication system 200.

In the case mobile telephone terminal 1 moves in the direction from ⑥ toward ①, the terminal 1 maintains an established communication with BS 20 and BSC 22 through radio transmission path 20r while the terminal 1 stays in coverage service area 24 of mobile telecommunication system 200.

As mobile terminal 1 advances further toward ①, it comes to enter overlapping service area 34. Mobile radio terminal 1, upon reaching near a hard handoff boundary point ③, notices BSC 22 by means of BS 20 that the electric-field intensity of the radio signal transmitted from BC 20 of mobile telecommunication system 200 has reduced to less than a call-channel drop threshold predetermined to judge whether or not the concerned call is to be dropped from mobile telecommunication system 200, as well as notices the field intensities of the radio signals transmitted from the peripheral base stations (cf. C11 and C12 in FIG. 3).

BSC 22, when receiving a notice C12, judges whether mobile telecommunication system 100 can provide a better quality of service in its coverage service area 14 to mobile terminal 1 of interest than mobile telecommunication system 200 can in its own coverage service area 24, based on the information about the field intensities included in the received notice C12.

In case that BSC 22 judges the system 100 to be preferred to offer a better quality of service, then BSC 22 of mobile telecommunication system 200 sends, to BSC 12 of mobile telecommunication system 100, a request for reserving a call channel of BS 10 in order to reserve a new call channel of mobile telecommunication system 100 to be used after the hard handoff (cf. FIG. 3, C13 and C14). BSC 22 also sends, to mobile terminal 1 through BS 20, a hard-handoff signal to handoff the call to BS 10 of mobile telecommunication system 100 (cf. FIG. 3, C15 and C16).

Mobile terminal 1 performs a hard handoff upon receiving the hard-handoff signal and transmits a hard-handoff completion signal to BSC 12 through BS 10 (cf. FIG. 4, C17 and C18).

BSC 12, when receiving the handoff completion signal, sends a request for releasing the concerned call channel of BS 20 to BSC 22 in mobile telecommunication system 200 so that the call channel employed before the handoff will be freed.

Mobile telephone terminal 1 thereafter is normally in an established communication with both BS 10 and BSC 12 through radio transmission path 10r in coverage service area 14 of mobile telecommunication system 100.

A mobile telecommunication system is generally designed such that the coverage service areas of neighboring radio base stations in mobile telecommunication systems overlap each other successively to provide a mobile telephone terminal successively with a satisfactory service quality.

However, in the case different mobile telecommunication systems to which neighboring base stations belong are individually provided by different vendors/operators, the neighboring base stations often have coverage service areas with narrow overlapping regions as shown in FIG. 4, unlike the base stations having ideally wide overlapping sections as shown in FIG. 1.

Here, the term "ideal" refers to the situation in which at a second hard-handoff boundary point, an electric field of the signal emitted by a first base station is superior in intensity to the electric field of the signal emitted by a second base station, and vice versa, where "a second hard-handoff boundary point" refers to the location at which the electric field intensity of the signal emitted by the second base station falls off to a predetermined threshold (the call-channel drop threshold).

For example, referring to FIG. 1, if BS 10 and BS 20 are defined as the first base station and the second base station, respectively, then point ③ is the second hard-handoff boundary point and point ④ is the first hard-handoff boundary point. As is shown in FIG. 1, field intensity 10 E is higher than field intensity 20E at second hard-handoff boundary point ③. At the first hard-handoff boundary point ④, on the contrary, field intensity 20 E is higher than field intensity 10E.

According to the above-described definition, the situation represented by FIG. 1 is ideal.

In the situation represented in FIG. 4, in contrast, while 10E is higher than 20E at ③, 20E is not higher than 10E at ④. For this reason, the situation represented by FIG. 4 is not ideal.

In the non-ideal situation represented in FIG. 4, suppose the situation in which mobile telephone terminal 1, which has been supplied with a service in service area 14 of BS 10 in mobile telecommunication system 100, arrives at hard-handoff boundary point ④. The terminal 1 experiences an electric field as weak as the predetermined threshold value at the boundary point ④, so that an intervendor/interoperator hard handoff is performed from mobile telecommunication system 100 to mobile telecommunication system 200. As a result, the terminal 1 can, accept a service in service area 24 of BS 20 in mobile telecommunication system 200.

The performance of this handoff likely causes an intervendor/interoperator handoff in the reverse direction from mobile telecommunication system 200 to mobile telecommunication system 100. This is because the electric field intensity 20E that terminal 1 receives from BS 20 is weak at the time directly after the first handoff is effected from system 100 to system 200 at point ④.

Consequently, a problem encountered has been that the hard handoffs are repeatedly performed between the mobile telecommunication systems of the different vendors/operators, thereby degrading the service quality of the system.

Generally speaking, the mobile telecommunication systems provided by different vendors/operators have the following problem: in such mobile telecommunication systems, communication services are commonly managed using parameters defined by the individual vendors/operators. As a result, an intervendor/interoperator communication sometimes encounters an obstacle caused by inconsistent parameters determined independently by the individual vendors/operators. For example, if a call-channel add-on threshold and a call-channel drop threshold of one mobile telecommunication system are set up inconsistently with those of another system, this inconsistency will be likely to cause repetitive handoffs.

In addition, the problem of repeated hard handoffs as described above can come up even when service area 14 of BS 10 in mobile telecommunication system 100 and service area 24 of BS 20 in mobile telecommunication system 200 provide an overlapping service area large enough to guarantee a satisfactorily high service quality to be rendered to mobile telephone terminal 1.

Such repeated hard handoffs will be likely to occur when the terminal 1 makes reciprocating movements across a hard-handoff boundary point or line in overlapping service area 34 in the order of the points such as ①②③④⑤ ④③②③④⑤. In this case, handoffs are performed between mobile telecommunication systems 100 and 200 repeatedly every time the terminal 1 passes hard handoff boundary points ③ and ④.

It is to be noted that, in actual cases, radio electric field 10E emitted by BS 10 and radio electric field 20E emitted by BS 20 cannot be represented as definite straight lines as is shown in FIG. 2, because of various variations in the radio environmental conditions. As a result, hard handoff boundary points ③ and ④ do not define definite points, and their locations change irregularly. Thus, even should mobile telephone terminal 1 not move, there can be an area where hard handoffs have to be repeatedly performed between mobile telecommunication systems. Such repeated handoffs give rise to a problem of degradation of service quality.

In view of the above-described problems, it is an object of the present invention to provide a mobile telecommunication system as well as a method of switching a call-channel between mobile telecommunication systems, capable of preventing the above-described repeated handoff to improve the service quality provided by the telecommunication systems.

SUMMARY OF THE INVENTION

In order to realize the above-described object, the present invention has been made allowing for the occasions that the mobile telecommunication systems provided by different vendors/operators are located adjacent so as to have their coverage service areas overlapping with each other; that the overlap area can be small so that the electric field intensity of the signal emitted by a first mobile telecommunication system at the hard handoff boundary point of the first system will be higher than the electric field intensity of the signal emitted by a second mobile telecommunication system at the same point; a radio mobile terminal can temporarily move from the service area of a first mobile telecommunication system to the service area of a second mobile telecommunication system only to return promptly to the original service area of the first system; and that radio environmental conditions can be varied irregularly.

In view of the above-described occasions, the present invention is intended to perform a handoff control only when a mobile telephone terminal is confirmed to have completed its steady entry to the service area of the destination mobile telecommunication system.

The present invention is further intended to decrease traffic on a radio interface by providing a mobile telecommunication system with means for canceling a handoff control designated along with an action time. This serves to improve the service quality of the mobile telecommunication system.

In the mobile telecommunication system according to the present invention, the radio base station control unit (BSC) has means for providing a hard-handoff command signal to command a mobile telephone terminal to execute a hard handoff. The hard-handoff command signal is prescribed to become effective at a predetermined time after the mobile telephone terminal receives the hard-handoff command signal.

The radio base station control unit also has means for providing a hard-handoff command cancellation signal to command a mobile telephone terminal to cancel said hard-handoff command signal when said hard-handoff command signal has not become effective yet.

The mobile telephone terminal has means for executing cancellation of the hard-handoff command signal in response to said hard-handoff command cancellation signal.

The telecommunication system according to the present invention comprises the mobile telecommunication systems as defined above.

In the mobile telecommunication systems, the radio base station control unit has a first means for providing a hard-handoff command signal to command a mobile telephone terminal to execute a hard handoff when the mobile telephone terminal is in the overlapped service area. The hard-handoff command signal is prescribed to become effective a predetermined time after the mobile telephone terminal receives the hard-handoff command signal. The radio base station control unit also has a second means for providing a hard-handoff command cancellation signal to command the mobile telephone terminal to cancel the hard-handoff command signal when the hard-handoff command signal has not become effective yet.

The mobile telephone terminal has a means for executing cancellation of the hard-handoff command signal in response to said hard-handoff command cancellation signal.

The second means has judging means for judging whether or not the hard handoff that has been commanded through the hard-handoff command signal and that is now deferred until the predetermined time is to be executed. In case that the judging means judges the hard-handoff not to be executed, the radio base station control unit issues the hard-handoff command cancellation signal.

It is preferred that judging means, while said hard handoff is deferred, compares an intensity of an electric field emitted by a second base station monitored by the mobile telephone terminal of interest with a predetermined call-channel-add-on threshold of the second base station and in case that the intensity of the electric field emitted by the second base station is lower than the predetermined threshold, then the radio base station control unit issues the hard-handoff command cancellation signal so that the mobile telephone terminal may remain communicating with a first base station through the current call channel. In the above description, the first base station refers to a base station that has currently a call channel established to communicate with the mobile telephone terminal of interest and the second base station refers to the base station to which a call channel is to be handed over.

A method of performing a hard handoff of a call of a mobile telephone terminal in a telecommunication system according to the present invention is executed in the above-described telecommunication system.

In the description below, a radio base station that currently establishes connection with said mobile telephone terminal through a call channel is referred to as a first base station, and a radio base station a call is to be handed over from the first base station is referred to as a second base station.

The method includes steps of:

providing a hard-handoff command signal to command the mobile telephone terminal to execute a hard handoff, the hard-handoff command signal being prescribed to become effective at a predetermined time after the mobile telephone terminal receives said hard-handoff command signal, when the mobile telephone terminal monitors an intensity of an electric field emitted by said first base station lowered below a predetermined channel-drop threshold;

judging whether or not the hard handoff that has been commanded through the hard-handoff command signal and is now deferred until said predetermined time is to be executed;

providing a hard-handoff command cancellation signal to command a mobile telephone terminal to cancel the hard-handoff command signal when the hard-handoff command signal has not become effective yet, in case that the hard-handoff is judged not to be executed;

issuing the hard-handoff command cancellation signal to the mobile telephone terminal; and controlling said mobile telephone terminal to execute cancellation of the hard-handoff command signal in response to the hard-handoff command cancellation signal. It is preferred that the step of judging includes steps of:

comparing an intensity of an electric field emitted by a second base station measured by the mobile telephone terminal of interest with a predetermined call-channel-add-on threshold of the second base station, while the hard handoff is deferred; and issuing the hard-handoff command cancellation signal so that the mobile telephone terminal may remain communicating with a first base station through the current call channel, in case that the intensity of the electric field emitted by a second base station is lower than the predetermined threshold.

In the case at least two of said mobile telecommunication systems are provided by different vendors/operators, it is preferred that, when an intervendor/interoperator hard handoff is performed, a specific radio base station that currently establishes connection with said mobile telephone terminal through a call channel and that is to perform the hard handoff of interest is designated as a base station responsible for the hard-handoff.

The above and other objects, features and advantages of the present invention will become apparent from the following description referring to the accompanying drawings which illustrate an example of the preferred embodiment of the present invention.

DETAILED EXPLANATION OF PREFERRED EMBODIMENT

Figure 1:
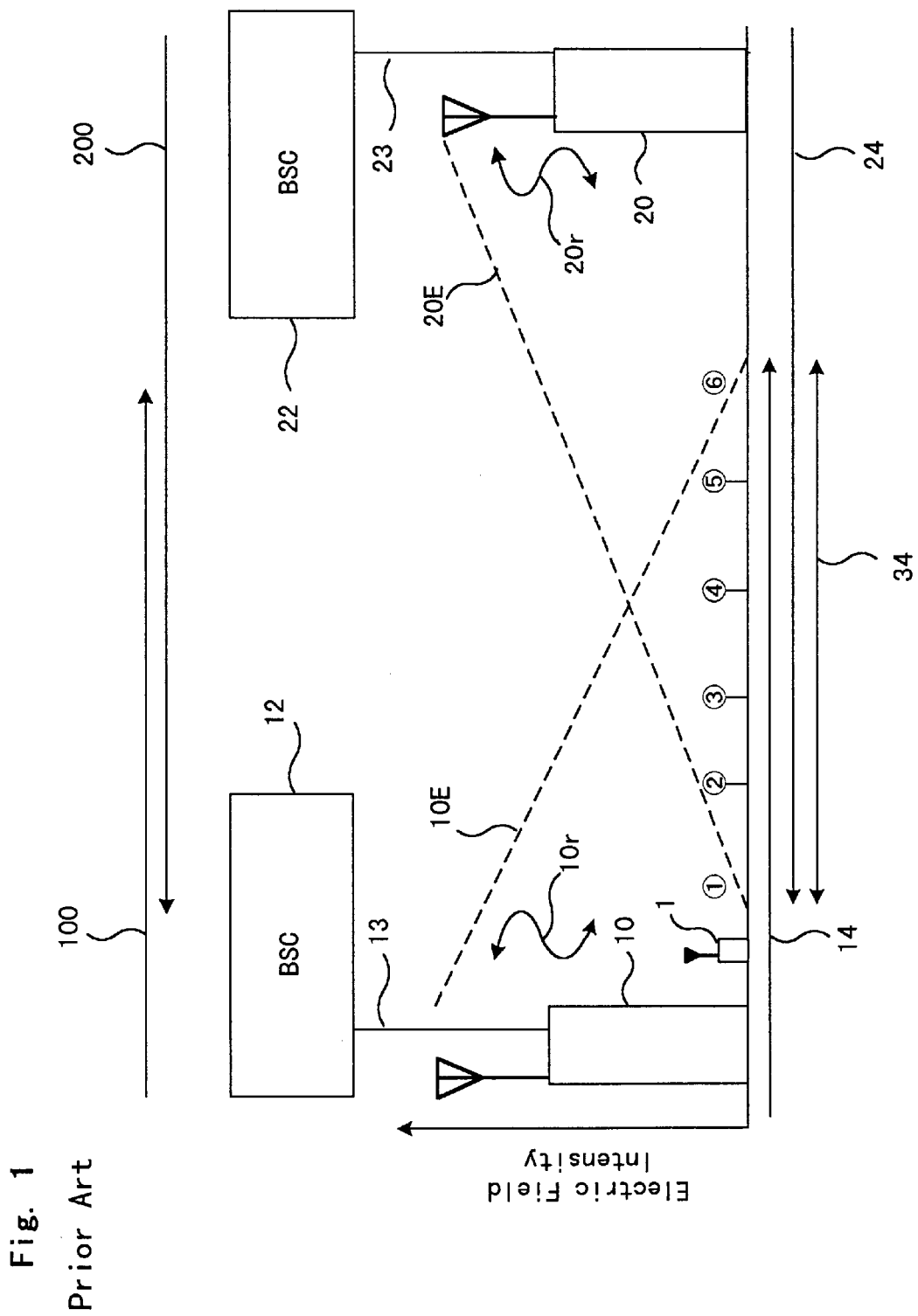
FIG. 1 shows a schematic diagram illustrative of a conventional telecommunication system.
Figure 2:
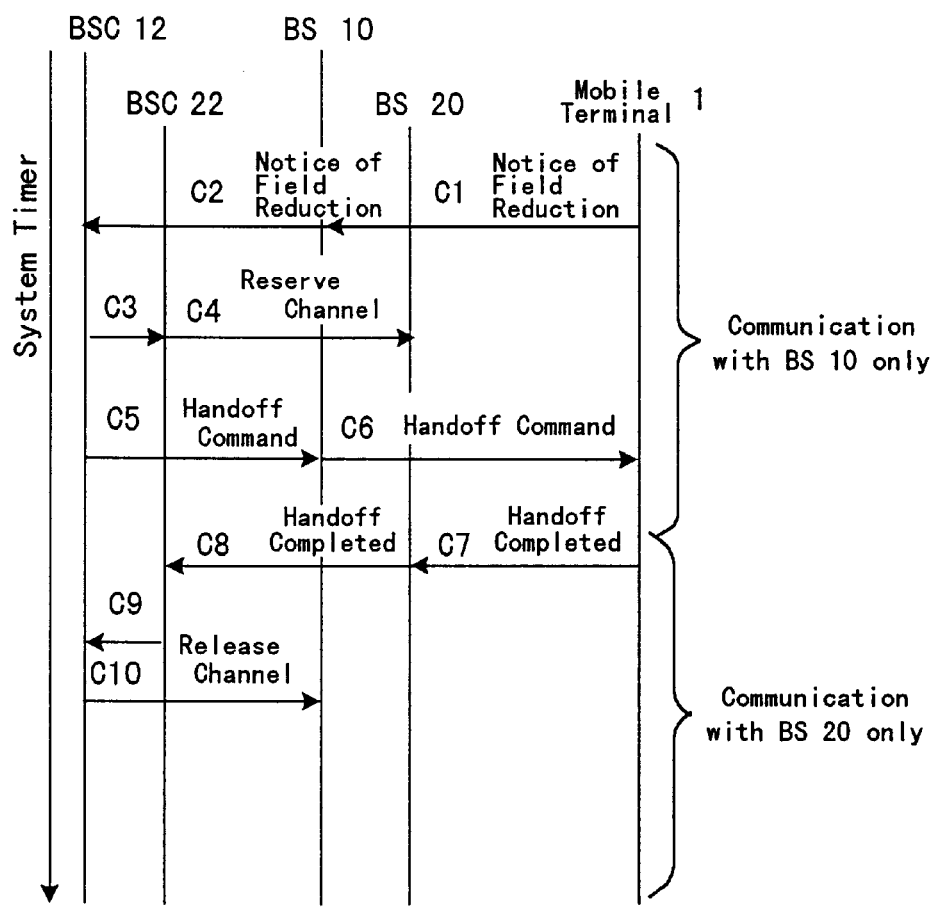
FIG. 2 is a time sequence diagram illustrative of prior art procedures to perform a handoff of a call between the two mobile telecommunication systems.
Figure 3:
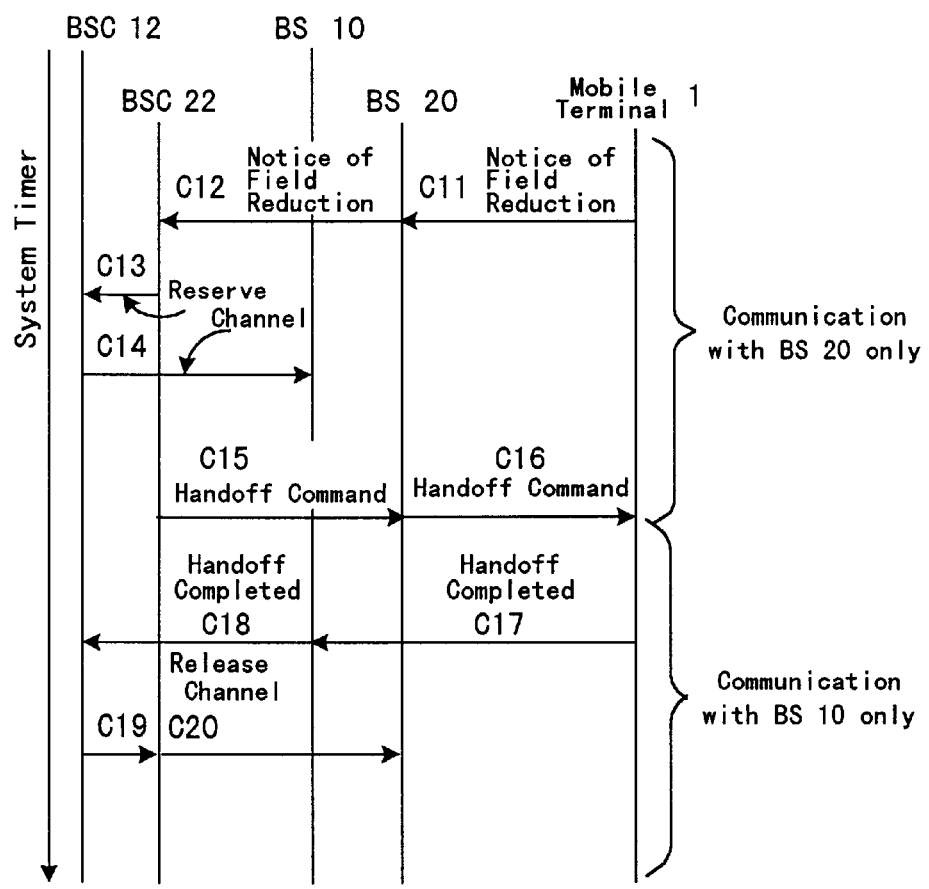
FIG. 3 is a time sequence diagram illustrative of prior art procedures to perform a handoff of a call between the two mobile telecommunication systems.
Figure 4:
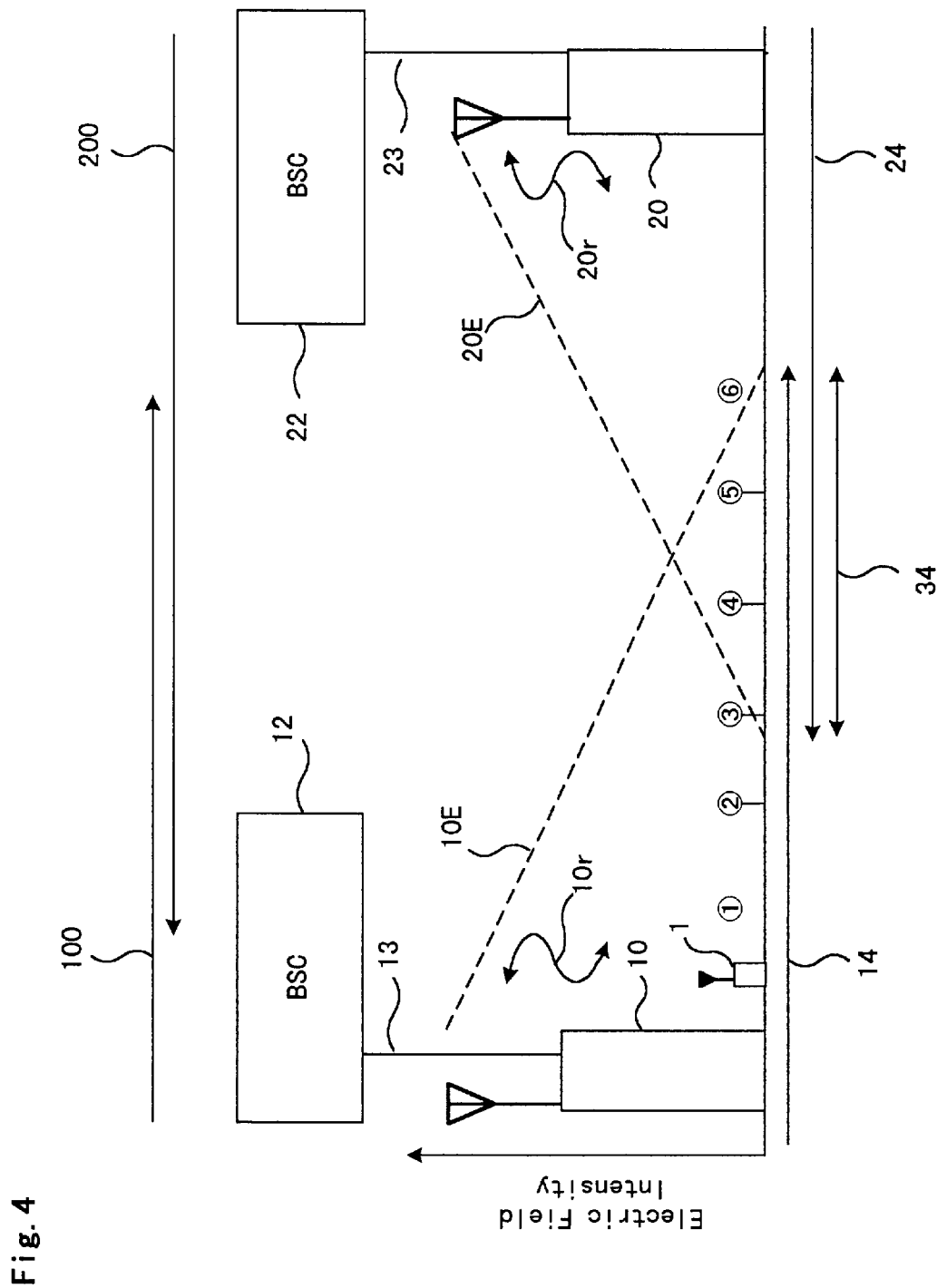
FIG. 4 shows a schematic diagram illustrative of a telecommunication system made up of mobile telecommunication systems provided by different vendors/operators.

FIG. 4 represents a schematic diagram of the telecommunication system to illustrate an embodiment of the present invention. In FIG. 4, a constituent element having the same function as that in FIG. 1 is denoted by the same reference number.

In the figure, it is assumed that mobile telecommunication systems 100 and 200 are located adjacent with their coverage service areas 14 and 24, respectively, overlapped with each other and provide services individually under management of different vendors/operators. Hereinafter, the area where the coverage service areas 14 and 24 overlap will be referred to as an overlap service area 34.

It is also assumed that mobile telephone terminal 1 moves along the route that connects the points ①–⑥ in the service areas shown in FIG. 4.

Mobile telephone terminal 1, when moving along the route in mobile telecommunication system 100, needs to perform a handoff between different vendors'/operators' mobile telecommunication systems in the service areas configured as assumed above.

Figure 5:
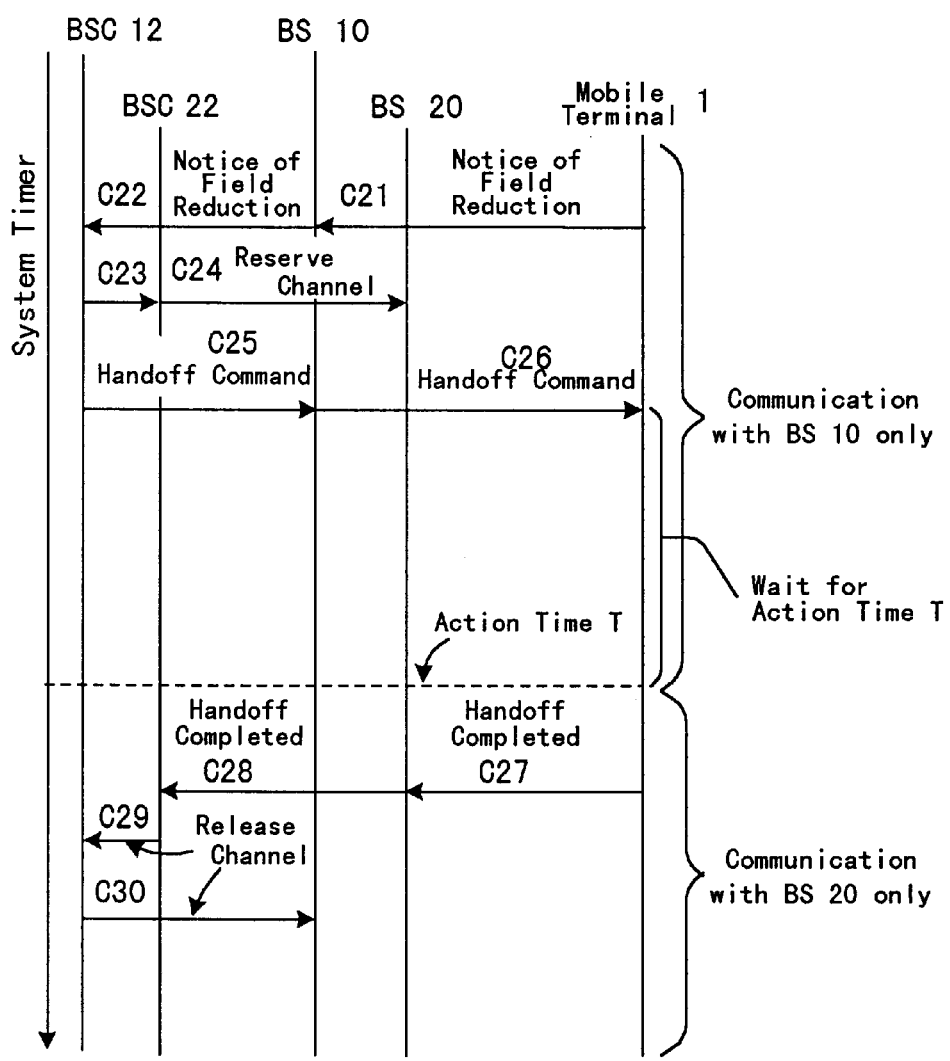
FIG. 5 is a time sequence diagram illustrative of procedures according to the present invention to perform a handoff of a call between the two mobile telecommunication systems.
Figure 6:
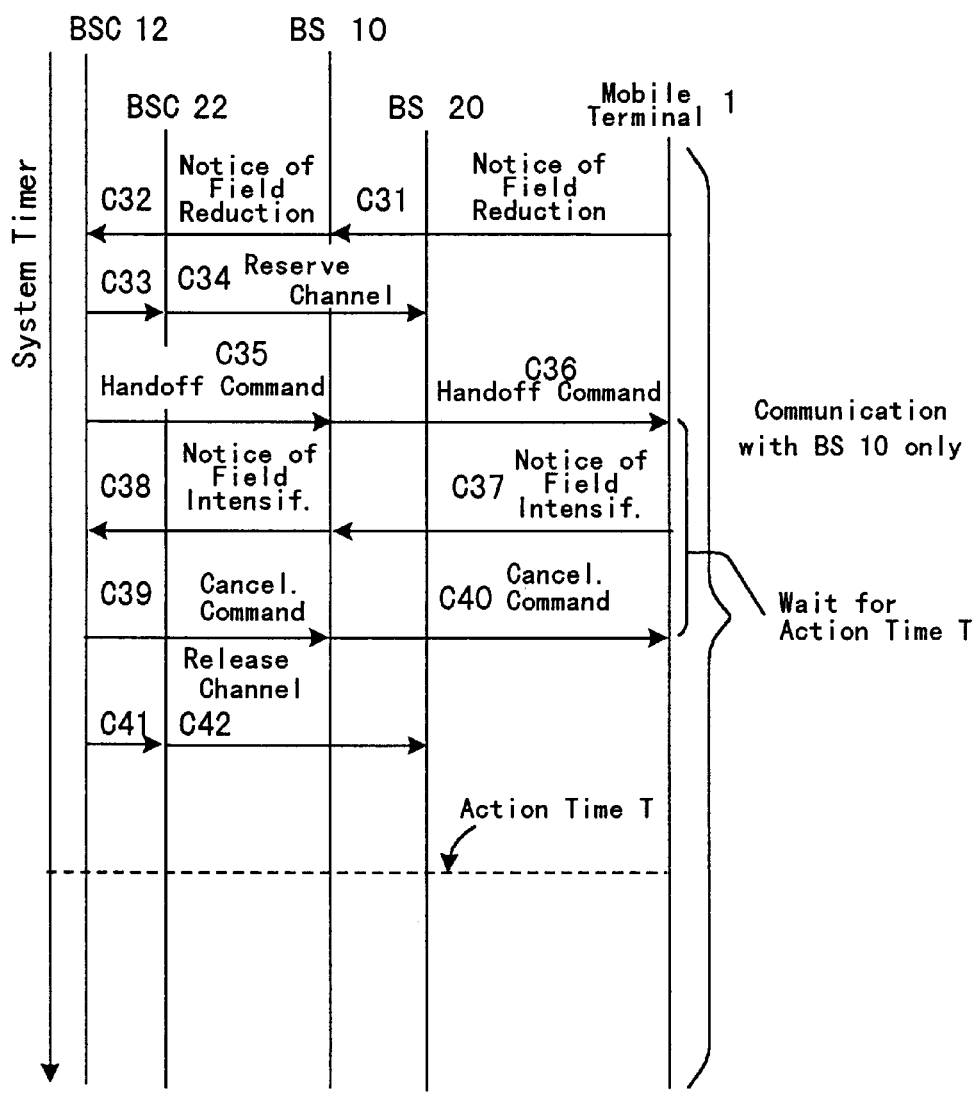
FIG. 6 is a time sequence diagram illustrative of the procedures according to the present invention to perform a handoff of a call between the two mobile telecommunication systems.

FIGS. 5 and 6 show a sequence of the processing steps executed in a handoff control-between different vendors'/operators' mobile telecommunication systems. The figures are related to the case mobile telephone terminal 1 has completed an entrance to service area 24 of telecommunication system 200 from service area 14 of telecommunication system 100 that had originally provided the terminal 1 with a service. Again, telecommunication systems 100 and 200 are different vendors'/operators' systems, i.e., the systems through which different vendors/operators provide services.

As described above with reference to FIG. 1, service area 14 established by BS 10 of the telecommunication system 100 has an overlap 34 with service area 24 established by BS 20 of different vendor's/operator's telecommunication system 200.

Mobile telephone terminal 1, when entering overlap service area 34 where different vendors'/operators' service areas overlap, is presumed to perform an intervendor/interoperator handoff to BS 20 from BS 10 with which the terminal 1 currently establishes a call. In order to prepare for this presumed handoff, BSC 12 designates BS 10 as a base station responsible for an intervendor/interoperator handoff, which provides a service area where the presumed handoff is executed.

FIG. 5 is a sequence diagram illustrating processing steps of the intervendor/interoperator handoff control in a first embodiment according to the present invention.

Referring to FIG. 5, the first embodiment will be illustrated.

Mobile telecommunication system 100 employs GPS (Global Positioning System) time or a reference system clock such as a high-accuracy master clock as a system timer. BSC 12, BS 10 and mobile telephone terminal 1 system-synchronizes a transmission/reception timing, etc. of a voice signal using the system timer.

Now, referring to FIG. 5, suppose the case mobile terminal 1 moves in the direction from ① toward ⑥ in FIG. 4 and performs a handoff of a call from telecommunication system 100 to telecommunication system 200. While moving within the service area 14 of mobile telecommunication system 100, mobile terminal 1 maintains the established communication with BS 10 and BSC 12 through radio transmission path 10r.

As mobile terminal 1 advances further toward ⑥ through point ②, it comes to enter overlapping service area 34 at ③. Mobile radio terminal 1, upon reaching a hard handoff boundary point ④, notices BSC 12 by means of BS 10 that the electric-field intensity of the radio signal 10E transmitted from BC 10 of mobile telecommunication system 100 has reduced to less than the call-channel drop threshold predetermined to judge whether or not the concerned call is to be dropped from mobile telecommunication system 100, as well as notices the field intensities of the radio signals transmitted from the peripheral base stations (cf. C21 and C22 in FIG. 5).

BSC 12, when receiving a notice C22, judges whether or not mobile telecommunication system 200 can provide a better quality of service in its coverage service area 24 to mobile terminal 1 of interest than mobile telecommunication system 100 can in its own coverage service area 14, based on the information about the field intensities included in the received notice C22.

In case that BSC 12 judges the system 200 to be preferred to provide a better quality of service, then BSC 12 of mobile telecommunication system 100 sends, to BSC 22 of mobile telecommunication system 200, a request for reserving a call channel of BS 20 in order to reserve a new call channel in mobile telecommunication system 200 to be used after the hard handoff (cf. FIG. 5, C23 and C24). BSC 12 also sends, to mobile terminal 1 through BS 10, a hard-handoff command signal to handoff the call to mobile telecommunication system 200 (cf. FIG. 5, C25 and C26).

BSC 12, when sending the handoff command signal to mobile telephone terminal 1 (cf. C25 and C26 in FIG. 5), sends an action time information attached to the hard-handoff command signal. Here, the action time T refers to a value of the system timer indicating the time when the hard-handoff becomes effective in the future. Mobile telephone terminal 1 receives the action-time attached hard-handoff command signal and thereafter referring to the system timer, performs the hard-handoff control when the action time T has come.

In this way, the present invention allows the timing of performing intervendors'/interoperators' hard-handoff to be delayed within a limit such that the service of mobile telecommunication system will not be interrupted, so that the repetition of the hard-handoff can be checked. The delay is effected on the basis of the action-time attached hard-handoff command issued by the BSC.

Mobile terminal 1, after executing a hard handoff control at action time T, transmits a hard-handoff completion signal to BSC 22 through BS 20 (cf. FIG. 5, C27 and C28).

BSC 22, when receiving the hard-handoff completion signal, sends a request for releasing the concerned call channel of BS 10 to BSC 12 of mobile telecommunication system 100 so that the call channel employed before the handoff will be freed (cf. FIG. 5, C29 and C30).

Mobile telephone terminal 1 thereafter normally maintains an established communication with BS 20 and BSC 22 through radio transmission path 20r in coverage service area 24 of mobile telecommunication system 200.

The above-described embodiment has no means for canceling an already issued hard-handoff signal attached with an action time. As a result, mobile telephone terminal 1, once receiving the hard-handoff signal, is forced to execute a hard-handoff, even if the electric field intensity of the signal emitted by the base station that has been a service base station restores the intensity above the call-channel add-on threshold. This results in an extra hard-handoff such as an unnecessary hard-handoff control and a repeated hard-handoff. For example, suppose there is an occasion where a mobile terminal is in a service area of a first base station and the intensity of the electric field coming from the first base station lowers below the call-channel drop threshold on account of temporary change in the electric field. In this event, since the mobile terminal does not know the low electric field is temporary, the terminal will execute a hard-handoff processing step and receive an action-time attached hard-handoff command signal to command a handoff to a second base station. Thus, a first hard-handoff will be forcedly executed even if the electric field intensity restores a normal value. This kind of a hard-handoff is an unnecessary hard-handoff.

Furthermore, in the above-described occasion, if the intensity of the electric field emitted by the second base station is lower than the call-channel drop threshold at the handoff boundary point of the first base station, a second hard-handoff has to be carried out following the first hard-handoff. This kind of repeated hard-handoffs is likely to occur when a mobile terminal performs a hard-handoff based on a temporary change in an electric field intensity.

The present embodiment is provided with means for canceling the hard-handoff command signal attached with an action time. In this way, an unnecessary hard-handoff control or an extra hard-handoff control can be deleted whenever the hard-handoff control is perceived as unnecessary. The deletion of an unnecessary or extra hard-handoff allows an amount of traffic on a radio transmission line to decrease thereby improving the quality of service.

FIG. 6 is a time sequence diagram illustrative of procedures to perform an intervendor/interoperator hard-handoff control.

Referring to FIG. 6, suppose there is a case where mobile terminal 1 moves in the direction from ① toward ⑥ maintaining the established communication with BS 10 and BSC 12 through radio transmission path 10r.

Mobile radio terminal 1, upon reaching a hard handoff boundary point ④, notices BSC 12 through BS 10 that the electric-field intensity of the radio signal transmitted from BC 10 that has had an established communication with the terminal 1 has lowered below the call-channel drop threshold as well as notices the field intensities of the radio signals transmitted from the peripheral base stations (cf. C31 and C32 in FIG. 6).

BSC 12, when receiving the notice of the electric field attenuation, judges whether or not BS 10, which sends the signal of the attenuated electric field, is a base station designated as a base station to be subject to an intervendor/interoperator hard-handoff. If so, BSC 12 judges that mobile telecommunication system 200 can provide a better quality of service in its coverage service area 24 to mobile terminal 1 of interest than mobile telecommunication system 100 can in its own coverage service area 14, provided that the electric fields of the signals sent from all the peripheral base stations is lower than the call-channel add-on thresholds of the peripheral base stations.

After this judgement, BSC 12 of mobile telecommunication system 1.00 sends, to BSC 22 of mobile telecommunication system 200, a request for reserving a call channel of BS 20 in order to reserve a new call channel of mobile telecommunication system 200 to be used after the hard handoff (cf. FIG. 6, C33 and C34). BSC 12 also sends, to mobile terminal 1 through BS 10, an action-time attached hard-handoff signal attached with an action time T to hand off the call to BS 20 in mobile telecommunication system 200 (cf. FIG. 6, C35 and C36).

It is to be noted that the value of the action time T attached to the action-time attached hard-handoff signal sent from BSC 12 has to be determined such that the communication between mobile telephone terminal 1 and BS 10 will not be broken off. For example, referring to FIG. 4, the action time T is preferably set up so that the hard-handoff will be performed in the region near the point ⑤, even in the case mobile telephone terminal 1 moves from point ④ further toward point ⑥.

Mobile telephone terminal 1, when receiving an action-time attached hard-handoff signal, defers execution of the hard-handoff control until the action time T. In this event, mobile telephone terminal 1 awaits the action time T while keeping the communication with BS 10 and BSC 12 established. Mobile telephone terminal 1 measures the intensities of the radio electric fields emitted by the peripheral base stations while awaiting the action time T.

When mobile telephone terminal 1 returns the moving direction from point ④ toward point ① while awaiting the action time T, the electric field 10E emitted by BS 10 responsible for the intervendor-handoff (will be referred to as an intervendor-handoff responsible base station) restores its intensity to the value above the call-channel add-on threshold. In this event, mobile telephone terminal 1 notices BSC 12 that the electric field emitted by BS 10 has intensified. (cf. FIG. 6, C37 and C38) Hereinafter, this notice is referred to as a field intensification notice.

BSC 12, when receiving the field intensification notice, judges whether or not BS 10, which sends the signal of the intensified electric field, is an intervendor-handoff responsible base station. If so, BSC 12 further judges whether or not mobile telecommunication system 100 can provide a better quality of service in its coverage service area 14 to mobile terminal 1 of interest and also an intervendor/interoperator hard-handoff to BS 20 in mobile telecommunication system 200 is unnecessary.

If BSC 12 judges that the intervendor/interoperator hard-handoff is unnecessary, BSC 12 sends an action-time cancellation signal to mobile telephone terminal 1 (cf. FIG. 6, C39 and C40). The action-time cancellation signal serves to cancel the hard-handoff signal deferred until the action time T. BSC 12 further acts to send a request for releasing a call-channel to BSC 22 in mobile telecommunication system 200 to have BS 20 release the previously reserved call channel (cf. FIG. 6, C41 and C42).

Mobile telephone terminal 1, when receiving the action-time cancellation signal, discards the deferred hard-handoff signal that has been awaiting the action time T, to have the communication with BS 10 and BSC 12 kept established through radio transmission path 10r.

Next, suppose there is a case where a mobile telephone terminal 1, which has received an action-time-attached hard-handoff signal and is now in the state of awaiting the action time T, moves from point ④ further toward point ⑥. In this case, the intensity of radio electric field 10E will not exceed the call-channel add-on threshold of BS 10. Thus, the hard-handoff control will not be declined. As a result, mobile telephone terminal 1 performs the deferred hard-handoff control when the action time T has come.

Mobile telephone terminal 1 sends a hard-handoff completion signal to BSC 22 through BS 20 upon completion of the hard-handoff processing.

BSC 22, when receiving the hard-handoff completion signal, sends BSC 12 a call-channel release signal to request BSC 12 to free the call channel the mobile telephone terminal 1 has been employing (FIG. 6, C29 and C30).

Mobile telephone terminal 1 thereafter continues to maintain the established communication with BS 20 and BSC 22 through radio transmission line 20.

As described above, the mobile telecommunication systems and the method of switching a call-channel between the mobile telecommunication systems, according to the present invention, allows to avoid repetitive hard handoffs between mobile telecommunication systems that are provided by different vendors/operators, located adjacent with their coverage service areas overlapped with each other.

By the action-time attached hard-handoff signal, a mobile telephone terminal can defer execution of the hard handoff until a steady entry into a target service area is ensured. Thus, the repetitive handover caused by a temporary change in radio communication environments as well as by reciprocating movements of a mobile telephone terminal across a handoff boundary line or point can be avoided to some extent.

The hard-handoff command cancellation signal according to the present invention, however, offers an advantage of compensating for the disadvantage of the action-time attached hard-handoff signal that the action-time attached hard-handoff signal has no capability of stopping execution of the handoff of interest even where the handoff becomes unnecessary before the action time.

Since such a case is likely to take place in an intervendor/interoperator call handoff, the present invention serves to improve a quality of service particularly in the mobile telecommunication systems provided by differing vendors/operators.

It is to be understood, however, that although the characteristics and advantages of the present invention have been set forth in the foregoing description, the disclosure is illustrative only, and changes may be made within the scope of the appended claims.

What is claimed is:

1. A telecommunication system having mobile telecommunication systems located with their coverage service areas overlapped with each other, each of said mobile telecommunication systems providing a communication service to a mobile telephone terminal through a radio base station and a radio base station control unit to control communication processing of said radio base station and said mobile telephone terminal, said radio base station control unit having a first means for providing a hard-handoff command signal to command said mobile telephone terminal to execute a hard handoff when said mobile telephone terminal is in the overlapped service area, said hard-handoff command signal being prescribed to become effective at a predetermined time after said mobile telephone terminal receives said hard-handoff command signal; and a second means for providing a hard-handoff command cancellation signal to command said mobile telephone terminal to cancel said hard-handoff command signal when said hard-handoff command signal has not become effective yet, and said mobile telephone terminal having means for executing cancellation of said hard-handoff command signal in response to said hard-handoff command cancellation signal, wherein said second means has judging means for judging whether or not the hard handoff that has been commanded through said hard-handoff command signal and is now deferred until said predetermined time is to be executed, and in case that said judging means judges said hard-handoff not to be executed, said radio base station control unit issues said hard-handoff command cancellation signal, wherein said judging means, while said hard handoff is deferred, compares an intensity of an electric field emitted by a second base station measured by the mobile telephone terminal of interest with a predetermined call-channel-add-on threshold of said second base station and in case that said intensity of the electric field emitted by a second base station is lower than said predetermined threshold, then said radio base station control unit issues said hard-handoff command cancellation signal so that said mobile telephone terminal may remain communicating with a first base station through the current call channel, said first base station referring to a base station that has currently a call channel established to communicate with the mobile telephone terminal of interest and said second base station referring to the base station to which a call channel is to be handed over, wherein said mobile telephone terminal does not perform any handoff operations in a time range from a first time at which said hard-handoff command signal is received to a second time at which said predetermined time occurs.

2. A telecommunication system having mobile telecommunication systems located with their coverage service areas overlapped with each other, each of said mobile telecommunication systems providing a communication service to a mobile telephone terminal through a radio base station and a radio base station control unit to control communication processing of said radio base station and said mobile telephone terminal, said radio base station control unit having a first means for providing a hard-handoff command signal to command said mobile telephone terminal to execute a hard handoff when said mobile telephone terminal is in the overlapped service area, said hard-handoff command signal being prescribed to become effective at a predetermined time after said mobile telephone terminal receives said hard-handoff command signal; and a second means for providing a hard-handoff command cancellation signal to command said mobile telephone terminal to cancel said hard-handoff command signal when said hard-handoff command signal has not become effective yet, and said mobile telephone terminal having means for executing cancellation of said hard-handoff command signal in response to said hard-handoff command cancellation signal, wherein said second means has judging means for judging whether or not the hard handoff that has been commanded through said hard-handoff command signal and is now deferred until said predetermined time is to be executed, and in case that said judging means judges said hard-handoff not to be executed, said radio base station control unit issues said hard-handoff command cancellation signal, wherein said judging means, while said hard handoff is deferred, compares an intensity of an electric field emitted by a second base station measured by the mobile telephone terminal of interest with a predetermined call-channel-add-on threshold of said second base station and in case that said intensity of the electric field emitted by a second base station is lower than said predetermined threshold, then said radio base station control unit issues said hard-handoff command cancellation signal so that said mobile telephone terminal may remain communicating with a first base station through the current call channel, said first base station referring to a base station that has currently a call channel established to communicate with the mobile telephone terminal of interest and said second base station referring to the base station to which a call channel is to be handed over, wherein said radio base station control unit issues a reserve channel command to a second radio base station control unit that controls said second base station, wherein said second base station allocates, based on a command sent from said second radio base station controller, another call channel to be utilized to effectuate communication between said second base station and said mobile telephone terminal starting at a time when said predetermined time occurs and said call channel has been handed over from said call channel of said first base station to said another call channel of said second base station.

3. A telecommunication system having mobile telecommunication systems located with their coverage service areas overlapped with each other, each of said mobile telecommunication systems providing a communication service to a mobile telephone terminal through a radio base station and a radio base station control unit to control communication processing of said radio base station and said mobile telephone terminal, said radio base station control unit having a first means for providing a hard-handoff command signal to command said mobile telephone terminal to execute a hard handoff when said mobile telephone terminal is in the overlapped service area, said hard-handoff command signal being prescribed to become effective at a predetermined time after said mobile telephone terminal receives said hard-handoff command signal; and a second means for providing a hard-handoff command cancellation signal to command said mobile telephone terminal to cancel said hard-handoff command signal when said hard-handoff command signal has not become effective yet, and said mobile telephone terminal having means for executing cancellation of said hard-handoff command signal in response to said hard-handoff command cancellation signal, wherein said second means has judging means for judging whether or not the hard handoff that has been commanded through said hard-handoff command signal and is now deferred until said predetermined time is to be executed, and in case that said judging means judges said hard-handoff not to be executed, said radio base station control unit issues said hard-handoff command cancellation signal, wherein said judging means, while said hard handoff is deferred, compares an intensity of an electric field emitted by a second base station measured by the mobile telephone terminal of interest with a predetermined call-channel-add-on threshold of said second base station and in case that said intensity of the electric field emitted by a second base station is lower than said predetermined threshold, then said radio base station control unit issues said hard-handoff command cancellation signal so that said mobile telephone terminal may remain communicating with a first base station through the current call channel, said first base station referring to a base station that has currently a call channel established to communicate with the mobile telephone terminal of interest and said second base station referring to the base station to which a call channel is to be handed over, wherein, when said predetermined time has occurred in a case where said hard-handoff command cancellation signal has not been output by said radio base station control unit, said first base station releases said call channel to be used for a future communication with another mobile telephone terminal when a handoff complete command is sent from said second radio base station controller to said radio base station controller, which causes said radio base station controller to output a release channel command to said first base station to thereby release said call channel.

4. A telecommunication system having mobile telecommunication systems located with their coverage service areas overlapped with each other, each of said mobile telecommunication systems providing a communication service to a mobile telephone terminal through a radio base station and a radio base station control unit to control communication processing of said radio base station and said mobile telephone terminal, said radio base station control unit having a first means for providing a hard-handoff command signal to command said mobile telephone terminal to execute a hard handoff when said mobile telephone terminal is in the overlapped service area, said hard-handoff command signal being prescribed to become effective at a predetermined time after said mobile telephone terminal receives said hard-handoff command signal; and a second means for providing a hard-handoff command cancellation signal to command said mobile telephone terminal to cancel said hard-handoff command signal when said hard-handoff command signal has not become effective yet, and said mobile telephone terminal having means for executing cancellation of said hard-handoff command signal in response to said hard-handoff command cancellation signal, wherein said second means has judging means for judging whether or not the hard handoff that has been commanded through said hard-handoff command signal and is now deferred until said predetermined time is to be executed, and in case that said judging means judges said hard-handoff not to be executed, said radio base station control unit issues said hard-handoff command cancellation signal, wherein said judging means, while said hard handoff is deferred, compares an intensity of an electric field emitted by a second base station measured by the mobile telephone terminal of interest with a predetermined call-channel-add-on threshold of said second base station and in case that said intensity of the electric field emitted by a second base station is lower than said predetermined threshold, then said radio base station control unit issues said hard-handoff command cancellation signal so that said mobile telephone terminal may remain communicating with a first base station through the current call channel, said first base station referring to a base station that has currently a call channel established to communicate with the mobile telephone terminal of interest and said second base station referring to the base station to which a call channel is to be handed over, wherein said mobile telephone terminal is only in communication with said first base station at times prior to said predetermined time occurring, and wherein said mobile telephone terminal is only in communication with said second base station at times after said predetermined time occurring when no cancellation of said hard-handoff command signal has been received by said mobile telephone terminal prior to said predetermined time occurring.

5. A method of performing a hard handoff of a call of a mobile telephone terminal in a telecommunication system, wherein said telecommunication system has mobile telecommunication systems located with their coverage service areas overlapped with each other, each of said mobile telecommunication systems providing a communication service to a mobile telephone terminal through a radio base station and a radio base station control unit to control communication processing of said radio base station and said mobile telephone terminal, and wherein a radio base station that currently establishes connection with said mobile telephone terminal through a call channel is referred to as a first base station and a radio base station a call is to be handed over from said first base station is referred to as a second base station, including steps of:

providing a hard-handoff command signal to command said mobile telephone terminal to execute a hard handoff, said hard-handoff command signal being prescribed to become effective at a predetermined time after said mobile telephone terminal receives said hard-handoff command signal, when said mobile telephone terminal monitors an intensity of an electric field emitted by said first base station lowered below a predetermined channel-drop threshold;

judging whether or not the hard handoff that has been commanded through said hard-handoff command signal and is now deferred until said predetermined time is to be executed;

providing a hard-handoff command cancellation signal to command a mobile telephone terminal to cancel said hard-handoff command signal when said hard-handoff command signal has not become effective yet, in case that said hard-handoff is judged not to be executed;

issuing said hard-handoff command cancellation signal to said mobile telephone terminal; and controlling said mobile telephone terminal to execute cancellation of said hard-handoff command signal in response to said hard-handoff command cancellation signal, wherein said mobile telephone terminal does not perform any handoff operations in a time range from a first time at which said hard-handoff command signal is received to a second time at which said predetermined time occurs.

6. A method of performing a hard handoff of a call of a mobile telephone terminal in a telecommunication system, wherein said telecommunication system has mobile telecommunication systems located with their coverage service areas overlapped with each other, each of said mobile telecommunication systems providing a communication service to a mobile telephone terminal through a radio base station and a radio base station control unit to control communication processing of said radio base station and said mobile telephone terminal, and wherein a radio base station that currently establishes connection with said mobile telephone terminal through a call channel is referred to as a first base station and a radio base station a call is to be handed over from said first base station is referred to as a second base station, including steps of:

providing a hard-handoff command signal to command said mobile telephone terminal to execute a hard handoff, said hard-handoff command signal being prescribed to become effective at a predetermined time after said mobile telephone terminal receives said hard-handoff command signal, when said mobile telephone terminal monitors an intensity of an electric field emitted by said first base station lowered below a predetermined channel-drop threshold;

judging whether or not the hard handoff that has been commanded through said hard-handoff command signal and is now deferred until said predetermined time is to be executed;

providing a hard-handoff command cancellation signal to command a mobile telephone terminal to cancel said hard-handoff command signal when said hard-handoff command signal has not become effective yet, in case that said hard-handoff is judged not to be executed;

issuing said hard-handoff command cancellation signal to said mobile telephone terminal;

controlling said mobile telephone terminal to execute cancellation of said hard-handoff command signal in response to said hard-handoff command cancellation signal;

issuing, by said radio base station control unit, a reserve channel command to a second radio base station control unit that controls said second base station; and allocating, by said second base station based on a command sent from said second radio base station controller, another call channel to be utilized to effectuate communication between said second base station and said mobile telephone terminal starting at a time when said predetermined time occurs and said call channel has been handed over from said call channel of said first base station to said another call channel of said second base station, wherein said step of judging includes steps of:

comparing an intensity of an electric field emitted by a second base station measured by the mobile telephone terminal of interest with a predetermined call-channel-add-on threshold of said second base station, while said hard handoff is deferred; and issuing said hard-handoff command cancellation signal so that said mobile telephone terminal may remain communicating with a first base station through the current call channel, in case that said intensity of the electric field emitted by a second base station is lower than said predetermined threshold.

7. A method of performing a hard handoff of a call of a mobile telephone terminal in a telecommunication system, wherein said telecommunication system has mobile telecommunication systems located with their coverage service areas overlapped with each other, each of said mobile telecommunication systems providing a communication service to a mobile telephone terminal through a radio base station and a radio base station control unit to control communication processing of said radio base station and said mobile telephone terminal, and wherein a radio base station that currently establishes connection with said mobile telephone terminal through a call channel is referred to as a first base station and a radio base station a call is to be handed over from said first base station is referred to as a second base station, including steps of:

providing a hard-handoff command signal to command said mobile telephone terminal to execute a hard handoff, said hard-handoff command signal being prescribed to become effective at a predetermined time after said mobile telephone terminal receives said hard-handoff command signal, when said mobile telephone terminal monitors an intensity of an electric field emitted by said first base station lowered below a predetermined channel-drop threshold;

judging whether or not the hard handoff that has been commanded through said hard-handoff command signal and is now deferred until said predetermined time is to be executed;

providing a hard-handoff command cancellation signal to command a mobile telephone terminal to cancel said hard-handoff command signal when said hard-handoff command signal has not become effective yet, in case that said hard-handoff is judged not to be executed;

issuing said hard-handoff command cancellation signal to said mobile telephone terminal;

controlling said mobile telephone terminal to execute cancellation of said hard-handoff command signal in response to said hard-handoff command cancellation signal;

releasing, when said predetermined time has occurred in a case where said hard-handoff command cancellation signal has not been output by said radio base station control unit, said call channel to be used for a future communication with another mobile telephone terminal when a handoff complete command is sent from said second radio base station controller to said radio base station controller; and outputting, by said radio base station controller, a release channel command to said first base station, to thereby release said call channel, wherein said step of judging includes steps of:

comparing an intensity of an electric field emitted by a second base station measured by the mobile telephone terminal of interest with a predetermined call-channel-add-on threshold of said second base station, while said hard handoff is deferred; and issuing said hard-handoff command cancellation signal so that said mobile telephone terminal may remain communicating with a first base station through the current call channel, in case that said intensity of the electric field emitted by a second base station is lower than said predetermined threshold.

8. A method of performing a hard handoff of a call of a mobile telephone terminal in a telecommunication system, wherein said telecommunication system has mobile telecommunication systems located with their coverage service areas overlapped with each other, each of said mobile telecommunication systems providing a communication service to a mobile telephone terminal through a radio base station and a radio base station control unit to control communication processing of said radio base station and said mobile telephone terminal, and wherein a radio base station that currently establishes connection with said mobile telephone terminal through a call channel is referred to as a first base station and a radio base station a call is to be handed over from said first base station is referred to as a second base station, including steps of:

providing a hard-handoff command signal to command said mobile telephone terminal to execute a hard handoff, said hard-handoff command signal being prescribed to become effective at a predetermined time after said mobile telephone terminal receives said hard-handoff command signal, when said mobile telephone terminal monitors an intensity of an electric field emitted by said first base station lowered below a predetermined channel-drop threshold;

judging whether or not the hard handoff that has been commanded through said hard-handoff command signal and is now deferred until said predetermined time is to be executed;

providing a hard-handoff command cancellation signal to command a mobile telephone terminal to cancel said hard-handoff command signal when said hard-handoff command signal has not become effective yet, in case that said hard-handoff is judged not to be executed;

issuing said hard-handoff command cancellation signal to said mobile telephone terminal;

controlling said mobile telephone terminal to execute cancellation of said hard-handoff command signal in response to said hard-handoff command cancellation signal, wherein said step of judging includes steps of:

comparing an intensity of an electric field emitted by a second base station measured by the mobile telephone terminal of interest with a predetermined call-channel-add-on threshold of said second base station, while said hard handoff is deferred; and issuing said hard-handoff command cancellation signal so that said mobile telephone terminal may remain communicating with a first base station through the current call channel, in case that said intensity of the electric field emitted by a second base station is lower than said predetermined threshold, wherein said mobile telephone terminal is only in communication with said first base station at times prior to said predetermined time occurring, and wherein said mobile telephone terminal is only in communication with said second base station at times after said predetermined time occurring when no cancellation of said hard-handoff command signal has been received by said mobile telephone terminal prior to said predetermined time occurring.

* * * * *